United States Patent
Komatsu (10) Patent No.: US 11,336,097 B2
(45) Date of Patent: May 17, 2022

(54) WIND POWER GENERATION SYSTEM WITH POWER STORAGE DEVICE

(71) Applicant: TOSHIBA MITSUBISHI-ELECTRIC INDUSTRIAL SYSTEMS CORPORATION, Chuo-ku (JP)

(72) Inventor: Hiroyoshi Komatsu, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 114 days.

(21) Appl. No.: 16/967,455

(22) PCT Filed: Jan. 21, 2019

(86) PCT No.: PCT/JP2019/001685
§ 371 (c)(1),
(2) Date: Aug. 5, 2020

(87) PCT Pub. No.: WO2020/152752
PCT Pub. Date: Jul. 30, 2020

(65) Prior Publication Data
US 2021/0226451 A1 Jul. 22, 2021

(51) Int. Cl.
*H02J 3/00* (2006.01)
*H02J 3/18* (2006.01)
(Continued)

(52) U.S. Cl.
CPC .............. *H02J 3/18* (2013.01); *H02J 3/28* (2013.01); *H02J 3/46* (2013.01); *H02J 2300/28* (2020.01)

(58) Field of Classification Search
CPC ...... H02J 3/381; H02J 3/18; H02J 3/28; H02J 3/46; H02J 2300/28; H02J 3/32;
(Continued)

(56) References Cited

U.S. PATENT DOCUMENTS

2019/0157982 A1* 5/2019 Brueckner ............ H02M 7/797

FOREIGN PATENT DOCUMENTS

| CN | 105186969 A | * | 12/2015 | |
| JP | 2006-333563 A | | 12/2006 | |
| WO | WO-2017106902 A1 | * | 6/2017 | .............. H02M 7/49 |

OTHER PUBLICATIONS

International Search Report dated Mar. 12, 2019 in PCT/JP2019/001685 filed on Jan. 21, 2019, 1 page.

* cited by examiner

Primary Examiner — Julio C. Gonzalez
(74) Attorney, Agent, or Firm — Oblon, McClelland, Maier & Neustadt, L.L.P.

(57) ABSTRACT

A wind power generation system with a power storage device includes a wind power generation system, a power storage device system, and a reactive power controller. The wind power generation system includes a wind power generator, a first power conversion circuit, a first control circuit, a first filter capacitor, and a circuit breaker interposed between the first filter capacitor and a grid connection point. The wind power generation system is configured to output the electric power converted by the first power conversion circuit to an electric power grid via the grid connection point. The power storage device system includes a power storage device, a second power conversion circuit, and a second control circuit that controls the second power conversion circuit to perform load leveling operation. The reactive power controller causes the second power conversion circuit to perform reactive power compensation operation.

4 Claims, 5 Drawing Sheets

(51) Int. Cl.
*H02J 3/28* (2006.01)
*H02J 3/46* (2006.01)

(58) Field of Classification Search
CPC ........... H02M 1/32; H02M 7/48; Y02E 70/30; Y02E 10/76
See application file for complete search history.

WIND POWER GENERATION SYSTEM WITH POWER STORAGE DEVICE

FIELD

This application relates to a wind power generation system with a power storage device.

BACKGROUND

Conventionally, as described in Patent Document 1 below, there has been known a wind power generation system having a wind power generation system section and a power storage device system section and constructed so as to operate in cooperation with an electric power grid.

CITATION LIST

Patent Literature

[PTL1] JP-A-2006-333563

SUMMARY

Technical Problem

In the above-mentioned wind power generation system with power storage device, the wind power generation system section and the power storage device system section each include a power conversion device. Specifically, the wind power generation system section includes a wind power generator, a power conversion circuit, a filter capacitor, and a circuit breaker. The filter capacitor is connected to an electrical path which connects the power conversion circuit and the grid connection point.

When the wind power generator is not generating electricity under low wind conditions or the like, the power conversion circuit may be stopped. In a state in which the power conversion circuit is stopped, when the circuit breaker is in a connected state, the filter capacitor is connected to the electric power grid. When such a connection state is established, there is a problem that the voltage at the grid connection point rises due to the filter capacitor during the stop state of the power conversion circuit. In particular, when a large number of wind power generation system sections are connected to the electric power grid, a large number of filter capacitors are connected to the electric power system while the power conversion circuit is stopped. In such a case, the above-mentioned voltage rise problem is likely to occur.

If the circuit breaker is tripped each time the power conversion circuit stops, the filter capacitor is disconnected from the grid connection point, and thus the voltage rise can be suppressed. However, if the circuit breaker is tripped every time the power conversion circuit stops in response to low wind conditions or the like, the frequency of opening and closing of the circuit breaker may become too high.

The present application has been made to solve the above-mentioned problems. It is an object of the present invention to provide an improved wind power generation system with a storage device capable of suppressing the occurrence of an undesirable voltage rise at a grid connection point while suppressing the frequent opening and closing of a circuit breaker.

Solution to Problem

A first aspect of the wind power generation system with the power storage device according to the present application includes:

a wind power generator system part that has a wind power generator, a first power conversion circuit for converting electric power generated by the wind power generator, a first control circuit for controlling the first power conversion circuit, a filter capacitor provided at an output side of the first power conversion circuit, a circuit breaker interposed between the filter capacitor and a grid connection point, and is configured to output electric power converted by the first power conversion circuit to an electric power grid via the grid connection point;

a power storage device system part that has a power storage device, a second power conversion circuit interposed between the power storage device and the grid connection point, and a second control circuit controlling the second power conversion circuit to perform load leveling operation between the power storage device and the electric power grid via the grid connection point; and reactive power control means configured to provide a reactive power command value to the second control circuit for causing the second power conversion circuit to perform reactive power compensation operation in a state in which the filter capacitor is connected to the grid connection point by making the circuit breaker connected and the first power conversion circuit is stopped, the reactive power compensation operation being an operation in which the second power conversion circuit receives reactive power from the filter capacitor via the grid connection point.

Advantageous Effects

In the above-mentioned wind power generation system with a power storage device, it is assumed that the filter capacitor is connected to the grid connection point while the first power conversion circuit is stopped. Even if such a situation occurs, according to the above-mentioned wind power generator system with the power storage device, it is possible to suppress the occurrence of an undesired voltage rise at the grid connection point due to the filter capacitor by operating the second power conversion circuit so as to accept the reactive power.

DESCRIPTION OF EMBODIMENTS

System Configurations of Embodiments.

Figure 1:
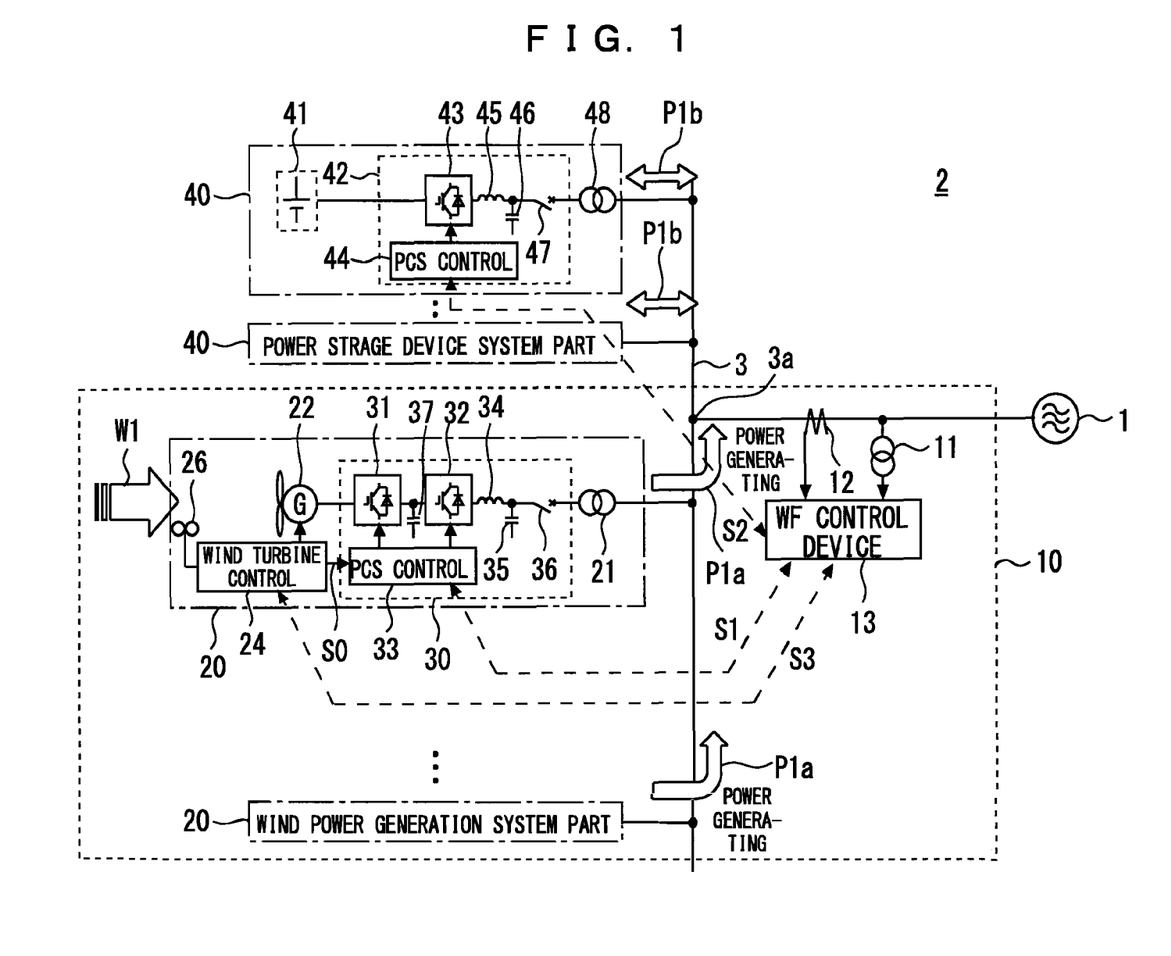
FIG. 1 is a system configuration diagram for explaining a configuration and operation of a power generation system according to an embodiment.

FIG. 1 is a system configuration diagram for explaining the configuration and operation of a power generation system 2 according to the embodiment. The power generation system 2 is a wind power generation system with a power storage device. The power generation system 2 is connected to an electric power grid 1. The power generation system 2 includes a Wind Farm 10 and a plurality of power storage device system parts 40. The wind farm 10 includes a voltage transformer 11, a current transformer 12, a wind farm control device 13, and a plurality of wind power generation system parts 20.

A power line 3 extends through a grid connection point 3a. The plurality of wind power generation system parts 20 and the plurality of power storage device system parts 40 are connected in parallel to the power line 3. The plurality of wind power generation system parts 20 have the same configuration as each other. The plurality of power storage device system parts 40 have the same configuration as each other.

The voltage transformer 11 is a type of potential transformer, and can measure the voltages of the power line between the grid connection point 3a and the electric power grid 1. The current transformer 12 is a type of potential transformer, and can measure the current flowing through the power line between the grid connection point 3a and the electric power grid 1. The wind farm control device 13 receives measured values from the current transformer 12 and the voltage transformer 11.

The wind power generation system part 20 includes a wind power generator 22, a wind turbine control unit 24, an anemometer 26, a first power conversion device 30, and an AC transformer 21.

The anemometer 26 measures a wind speed of wind which the wind power generator 22 receives. The wind turbine control unit 24 is configured to output a wind shortage signal S0, when a predetermined low wind condition is satisfied, to indicate that the low wind condition is satisfied.

As an example, the wind turbine control unit 24 determines whether or not the wind speed of the wind received by the wind power generator 22 is lower than a predetermined criterion based on the measurement value of the anemometer 26. The wind turbine control unit 24 may output the wind shortage signal S0 to a first control circuit 33 when a time period in which the wind speed is lower than the predetermined criterion wind speed continues for a predetermined time period. Upon receiving the wind shortage signal S0, the first control circuit 33 performs control to stop a first inverter circuit 32.

The first power conversion device 30 includes a converter circuit 31, a DC capacitor 37, the first inverter circuit 32, the first control circuit 33, a first AC reactor 34, a first filter capacitor 35, and a first circuit breaker 36. The wind power generation system part 20 is configured to output the electric power converted by the converter circuit 31 and the first inverter circuit 32 to the electric power gird 1 via the gird connection point 3a.

Although not shown in the figure, the first power conversion device 30 includes at least an instrument transformer to measure a DC voltage of the DC capacitor 37, a current transformer to measure an AC output current at an output end of the first inverter circuit 32, and an instrument transformer to measure an AC output voltage at the output end of the first inverter circuit 32.

The converter circuit 31 converts the AC power generated by the wind power generator 22 into DC power. The DC capacitor 37 receives DC power converted by the converter circuit 31. The first inverter circuit 32 is configured to be switchable between a first conversion mode and a second conversion mode.

The first conversion mode is a mode of converting and outputting the DC voltage inputted from the DC capacitors 37 into an AC voltage. In the first conversion mode, the first inverter circuit 32 is able to receive the electric power generated by the wind power generator 22 via the converter circuit 31, to convert the received electric power into AC power, and to output the AC power.

The second conversion mode is a mode in which a DC voltage is generated from an AC voltage on the output side thereof, and the DC voltage is applied to the DC capacitor 37.

The first control circuit 33 outputs a gate driving PWM control signal to semiconductor switching elements constituting the first inverter circuit 32. The first AC reactor 34 and the first filter capacitor 35 are provided on the output side of the first inverter circuit 32. The first circuit breaker 36 is interposed between the first filter capacitor 35 and the grid connection point 3a.

The power storage device system part 40 is a so-called ESS (Energy Storage System). The power storage device system part 40 includes a power storage device 41 as a battery, a second power conversion device 42, and an AC transformer 48.

The second power conversion device 42 includes a second inverter circuit 43 interposed between the power storage device and the grid connection point 3a, a second control circuit 44 for controlling the second inverter circuit 43, a second AC reactor 45, a second filter capacitor 46, and a second circuit breaker 47.

Although not shown in the figure, the second power conversion device 42 includes at least an instrument transformer to measure the DC voltage inputted from the power storage device 41, a current transformer to measure an AC output current at an output end of the second inverter circuit 43, and an instrument transformer to measure an AC output voltage at the output end of the second inverter circuit 43.

The second control circuit 44 outputs a gate driving PWM control signal to semiconductor switching elements constituting the second inverter circuit 43.

The power generation system 2 is a wind farm (Wind Farm) with a power storage device. Generally, the wind farm refers to a medium-scale or large-scale collective wind power generation system in which several tens or more wind power generation system parts 20 are provided.

The wind farm control device 13 is a central monitoring control device that integrally controls the entire power generation system 2. The wind farm control device 13 is configured to be able to communicate with the wind turbine control unit 24, the first control circuit 33, and the second control circuit 44, and to transmit and receive communication signals S1, S2, and S3 therewith. The wind farm control device 13 gives instructions to the first control circuits 33 of the plurality of wind power generation system parts 20 and the second control circuits 44 of the plurality of power storage system parts 40 based on the outputs of the instrument transformer, i.e., the current transformer 12 and the voltage transformer 11.

System Operation of Embodiments.
[System Operation in High Wind Condition]

With reference to FIG. 1, the operation of the system at the time of high wind conditions will be described. In FIG. 1, the wind W1 having a high wind speed reaches the wind power generation system part 20. During high wind conditions, the wind power generator 22 normally generates electric power. The generated AC output power P1a is supplied to the electric power grid 1 via the gird connection point 3a.

During normal power generation, the first power conversion device 30 operates in a "DC voltage control mode." The DC voltage control mode is a mode in which the first control circuit 33 carries out an inverter control based on the DC voltage of the DC capacitor 37.

Specifically, in the DC voltage control mode, the first control circuit 33 controls the first inverter circuit 32 to switch between the first conversion mode and the second conversion mode described above in accordance with the voltage of the DC capacitor 37. This makes it possible that the first conversion mode can output an AC power to a subsequent stage of the first inverter circuit 32 in the case where the voltage of the DC capacitor 37 is higher than a predetermined value. Furthermore, if the voltage of the DC capacitor 37 is equal to or less than the predetermined value, the DC capacitors 37 can be charged in the second conversion mode.

In the high wind condition, the second power conversion device 42 performs a load leveling operation. Specifically, the second control circuit 44 controls the second inverter circuit 43 so that the load leveling operation is performed between the power storage device and the electric power grid 1 via the grid connection point 3a.

By the load leveling operation, charged/discharged power P1b is caused between the power storage device system part 40 and the power line 3. "Load leveling operation" is a known operation and also referred to as LL operation, and is not new. Therefore, further description of the load leveling operation will be omitted.

[System Operation in Low Wind Condition]

Figure 2:
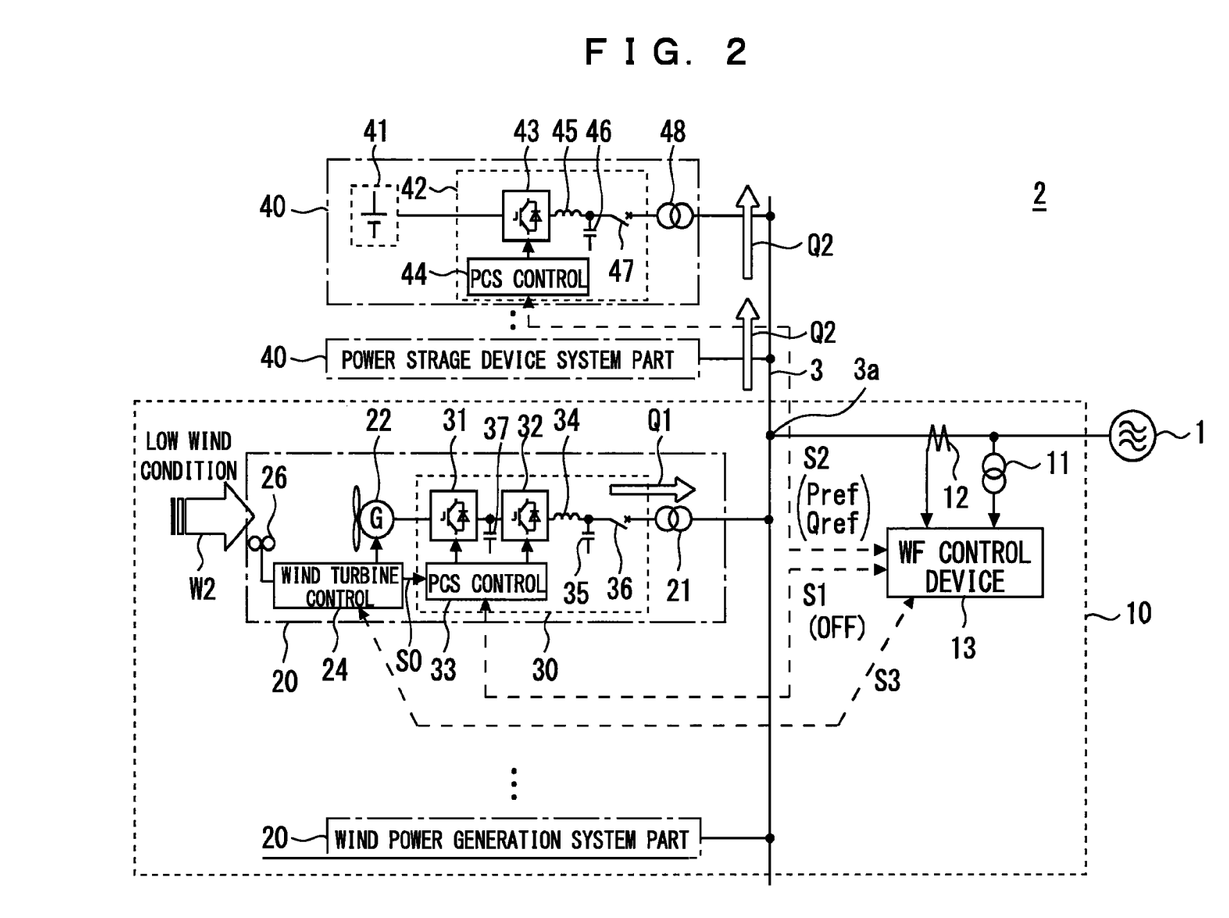
FIG. 2 is a system configuration diagram for explaining the configuration and operation of the power generation system according to the embodiment.

On the other hand, in low wind conditions, the power generation system 2 operates differently from high wind conditions. FIG. 2 is a system configuration diagram for explaining the configuration and operation of the power generation system 2 according to the embodiment. With reference to FIG. 2, the operation of the system at the time of low wind conditions will be described.

In FIG. 2, the wind W2 reaching the wind power generation system part 20 has a low wind speed. When the wind turbine control unit 24 supplies the wind speed shortage signal to the first control circuit 33, the first inverter circuit 32 is stopped. At this time, the first filter capacitor 35 is connected to the grid connection point 3a by making the first circuit breaker 36 connected.

In this state, the power generation system 2 according to the embodiment causes the second inverter circuit 43 to perform the "reactive power compensation operation" by "reactive power control means". The "reactive power control means" is configured to provide a reactive power command value Qref to the second control circuit 44. The reactive power control means may be referred to as a "controller". In the power generation system 2 according to the embodiment, the wind farm control device 13 acts as the reactive power control means.

The "reactive power compensation operation" is an operation in which the second inverter circuit 43 receives reactive power from the first filter capacitor 35 via the grid connection point 3a. It can also be said that the second inverter circuit 43 performs a so-called reactive operation.

In order to perform the reactive power compensation operation, the wind farm control device 13 as the reactive power control means outputs the reactive power command value Qref based on the outputs of the potential transformers, i.e., the current transformer 12 and the voltage transformer 11, so as to suppress a voltage rise at the grid connection point 3a. The wind farm control device 13 transmits the reactive power command value Qref to the second control circuit 44.

The second control circuit 44 receives an active power command value Pref and the reactive power command value Qref from the wind farm control device 13. The second control circuit 44 outputs the gate driving PWM signal of the inverter circuit so that the gate driving PWM signal causes the second inverter circuit 43 to output an AC output power such that the AC output power has the active power P and the reactive power Q corresponding to the received active power command value Pref and the received reactive power command value Qref.

It should be noted that, the inverter control technique corresponding to the active power command value Pref and the reactive power command value Qref is already a well-known technique, and is not new. Therefore, a detailed description is omitted.

In the embodiment, at least the reactive power command value Qref may be transmitted to the second control circuit 44. The reason is that it is sufficient if the "reactive power compensation operation" may cause the flow of the reactive power Q2 shown in FIG. 2 by operating the second inverter circuit 43 so that the second inverter circuit 43 receives the reactive power Q1 from the first filter capacitor 35 via the grid connection point 3a.

When the first filter capacitor 35 is simply suspended with respect to the electric power grid 1 while the first inverter circuit 32 is stopped, the first filter capacitor 35 exposed to a grid power during the stoppage of the first inverter circuit 32 becomes a reactive power generation source. When the first filter capacitor 35 becomes a reactive power generation source, a flow of reactive power Q1 occurs.

According to the power generation system 2 of the embodiment, the second inverter circuit 43 performs the reactive power compensation operation, whereby the reactive power can be transferred from the first filter capacitor 35 to the second inverter circuit 43.

Specifically, as shown in FIG. 2, reactive power Q2 is transferred from the first filter capacitor 35 to the second inverter circuit 43 via the grid connection point 3a and the power line 3. In order to create such a flow of the reactive power Q2, a negative reactive power command value Qref may be supplied to the second control circuit 44. It is preferable that the wind farm control device 13 outputs the reactive power command value Qref so as to sufficiently suppress the voltage rise at the grid connection point 3a, specifically, so as to cancel the voltage rise at the grid connection point 3a.

According to the above operation, the reactive power Q1 from the first filter capacitor 35 flows through the grid connection point 3a and becomes the reactive power Q2, and the reactive power Q2 is received by the second inverter circuit 43. As a result, even if the first filter capacitor 35 is connected to the grid connection point 3a while the first inverter circuit 32 is stopped, it is possible to suppress the voltage at the grid connection point 3a from rising due to the first filter capacitor 35.

Figure 4:
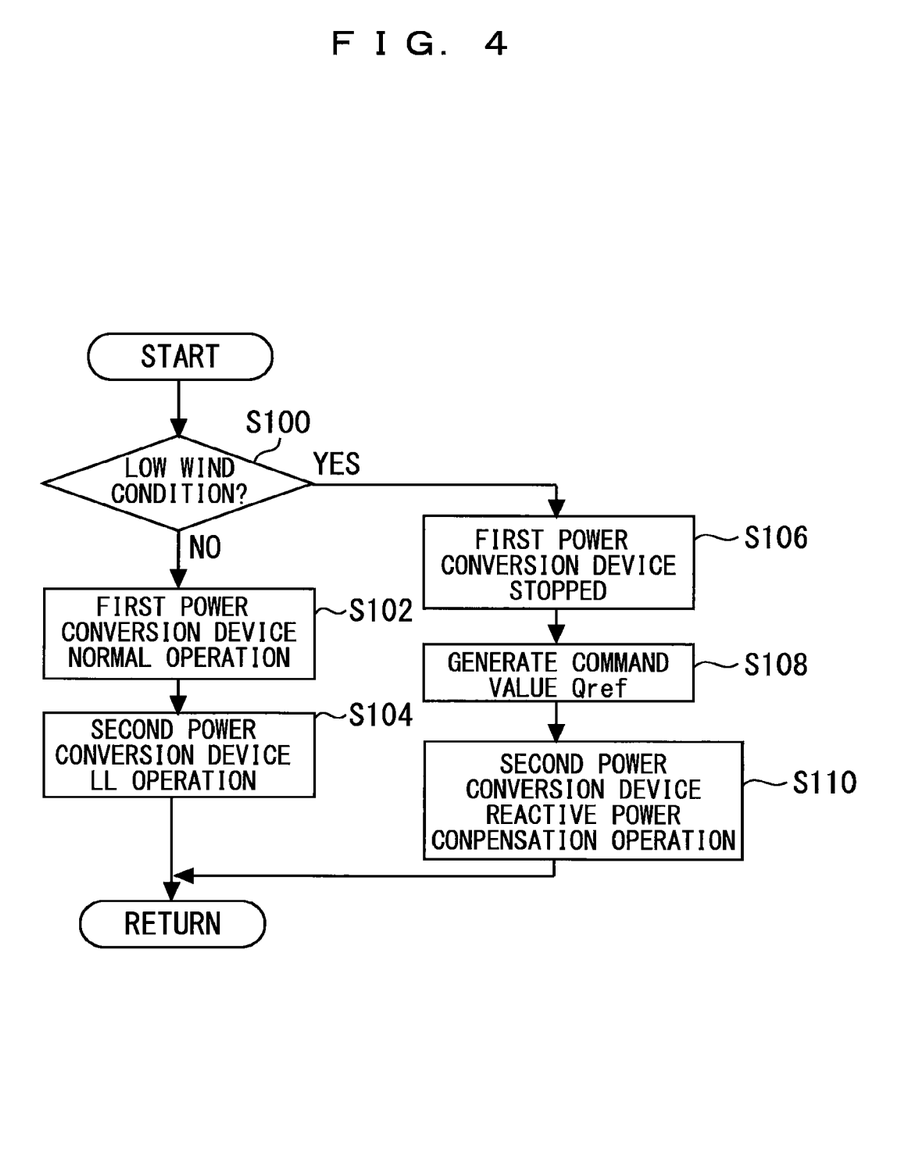
FIG. 4 is a flowchart illustrating the configuration of the power generation system according to the embodiment.

FIG. 4 is a flowchart illustrating a configuration of the power generation system 2 according to the embodiment. The flowchart of FIG. 4 is executed by the reactive power control means in the embodiment, and is executed by the wind farm control device 13 specifically in the system of FIGS. 1 and 2.

In the routine shown in FIG. 4, first, it is determined whether or not the wind conditions are low (step S100). In step S100, it is determined whether or not the wind speed of the wind received by the wind power generator 22 is lower than a predetermined criterion. As described above, in the embodiment, the wind turbine control unit 24 performs such a determination based on the measured value of the anemometer 26. The wind farm control device 13 receives the determination result of the wind condition from the wind turbine control unit 24.

If it is determined that the wind conditions are not low, the processing proceeds to step S102. In this case, the current wind conditions are considered to be sufficient for wind power generation. Therefore, the wind farm control device 13 instructs the first power conversion device 30 to perform normal power generation (step S102). In the normal generation mode, in an embodiment, the first power conversion device 30 operates in the DC voltage control mode.

Following the step S102, the wind farm control device 13 causes the second power conversion device 42 to perform the LL operation (i.e., the load leveling operation) (step S104). Thereafter, the processing returns.

On the other hand, if it is determined in the step S100 that the wind conditions are low, the processing proceeds to step S106. In this case, the current wind conditions are regarded as being insufficient for wind power generation. As described above, in the embodiment, when the wind turbine control unit 24 determines that the wind is insufficient, the wind shortage signal S0 is transmitted to the first control circuit 33. In response to the wind shortage signal S0, the first control circuit 33 stops the first inverter circuit 32. The stop state of the first inverter circuit 32 is transmitted to the wind farm control device 13 by the communication signal S1.

Next, the wind farm control device 13 executes a process of generating the reactive power command value Qref (step S108). Based on the outputs of the current transformer 12 and the voltage transformer 11, the wind farm control device 13 generates the reactive power command value Qref in order to suppress the voltage rise at the grid connection point 3a. A person skilled in the art can derive a concrete calculation method of the reactive power command value Qref for achieving the purpose of suppressing the voltage rise of the grid connection point 3a by using an active/reactive power detection technique such as a voltage phase detection by the voltage transformer 11 or using a known inverter-control command value generation technique. A detailed description of a known technique for calculating the reactive power command value is omitted.

Since the first filter capacitor 35 is the source of the reactive power Q1, the positive reactive power Q1 flows into the grid connection point 3a. Thus, for example, the reactive power command value Qref to the second power conversion device 42 can be generated such that the second power conversion device 42 generates the negative reactive power Q2 which just subtracts the positive reactive power Q1.

It should be noted that the number of parallel connections of the wind power generation system parts 20 and the number of parallel connections of the power storage device system parts 40 may be different. In this case, each of the reactive power command values Qref to each of the second power conversion devices 42 can be generated so that the plurality of second power conversion devices 42 share and accept the total sum of the reactive powers Q1 at the grid connection point 3a.

The reactive power command value Qref is transmitted to the second control circuit 44 by the communication signal S2.

Next, the second power conversion device 42 outputs an AC power having a reactive power specified by the received reactive power command value Qref (step S110). As a result, the reactive power compensation operation by the second power conversion device 42 is achieved. Thereafter, the processing returns.

Figure 3:
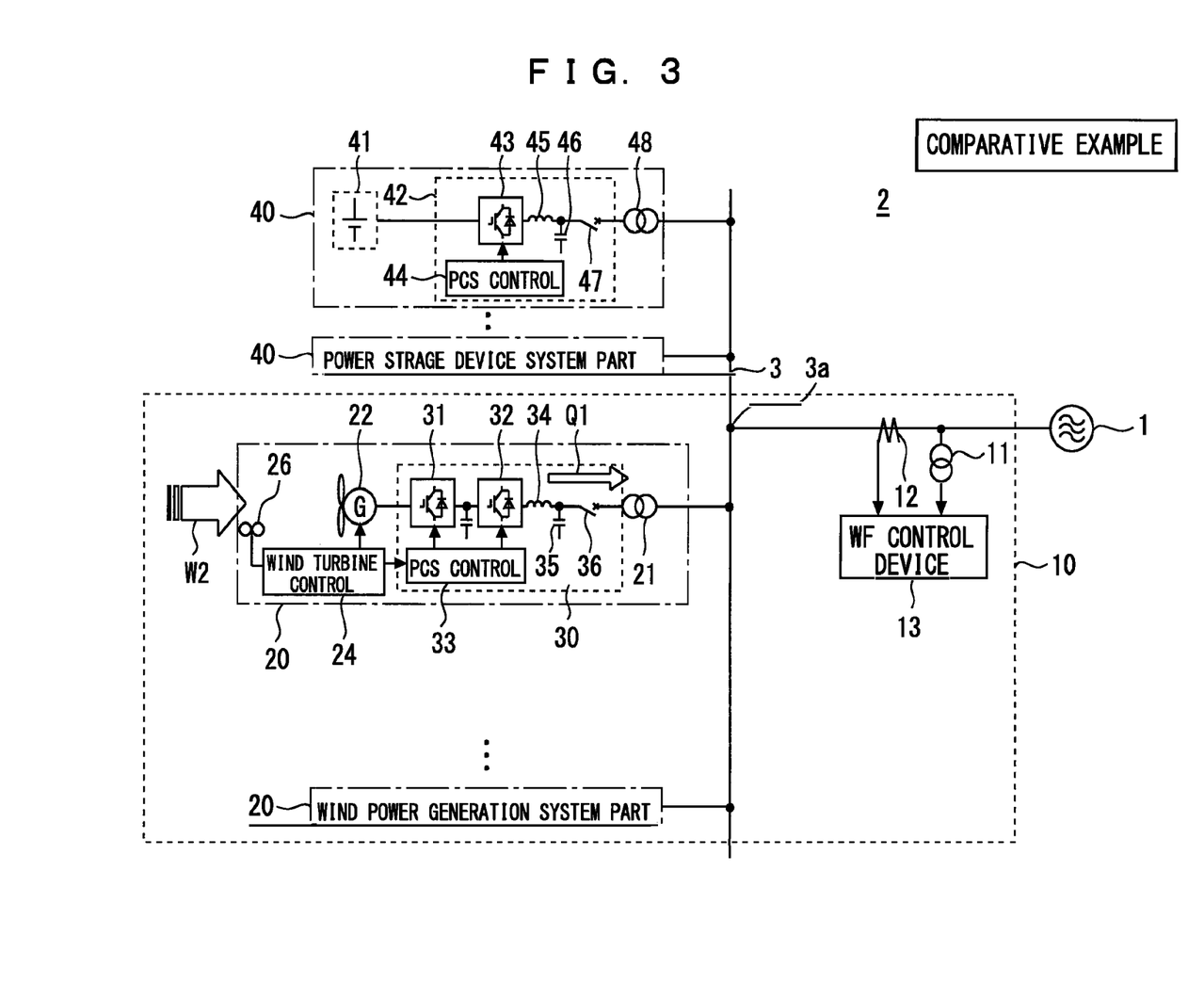
FIG. 3 is a diagram for explaining the operation of the power generation system according to the comparative example.

FIG. 3 is a diagram for explaining the operation of the power generation system 2 according to the comparative example. In the comparative example, "reactive power control means" according to the above embodiment is not provided. As described above, the first filter capacitor 35 exposed to the system power during the stop state of the first inverter circuit 32 becomes a generation source for generating the reactive power Q1.

In the comparative example of FIG. 3, since the second power conversion device 42 does not perform the reactive power compensation operation, the second inverter circuit 43 cannot accept the reactive power Q1. In such cases, the present inventor has found that an undesirable voltage rise occurs at the grid connection point 3a. According to the power generation system 2 of the embodiment, such an undesirable voltage rise can be suppressed.

Figure 5:
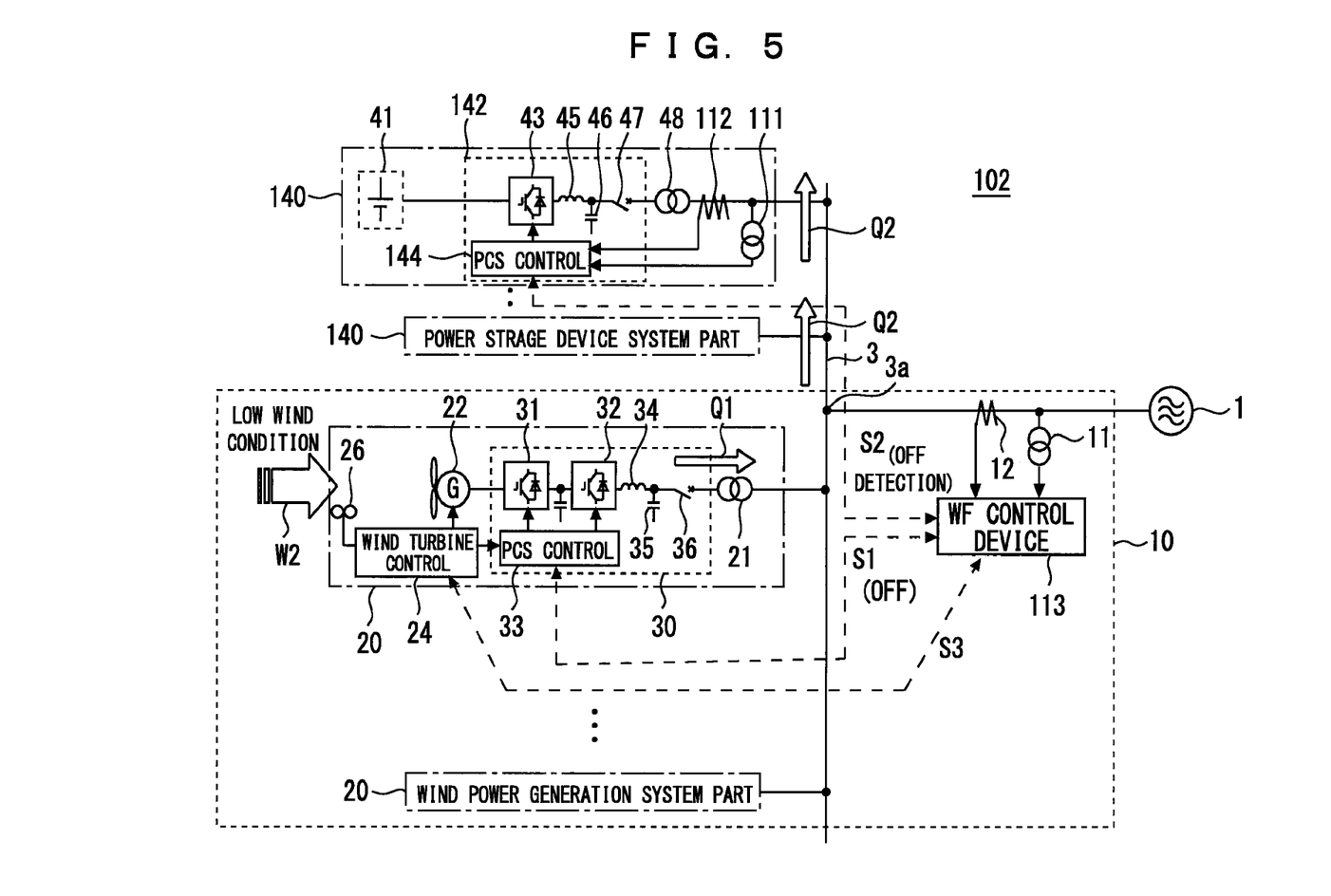
FIG. 5 is a system configuration diagram for explaining the configuration and operation of a power generation system according to a modification of the embodiment.

FIG. 5 is a system configuration diagram for explaining the configuration and operation of the power generation system 102 according to a modification of the embodiment. In the power generation system 102 according to the modification, the second power conversion device 142 in the power storage device system part 140 includes the current transformer 112 and the voltage transformer 111, which are potential transformers.

The current transformer 112 and the voltage transformer 111 are connected to a power line between the second inverter circuit 43 and the grid connection point 3a. It should be noted that, although not shown in FIG. 1, the current transformer 112 and the voltage transformer 111 are included in FIG. 1.

In the power generation system 2 of FIGS. 1 and 2, the wind farm control device 13 plays a role of the reactive power control means. In contrast, in the power generation system 102 according to the modification of the embodiment, the second control circuit 144 of the second power conversion device 142 acts as the reactive power control means. That is, the second control circuit 144 provided in each power storage device system part 140 operates as the reactive power control means according to the embodiment. Therefore, in this modification, it is not necessary for the wind farm control device 113 to have a function of the reactive power control means.

In this modification, the second control circuit 144 as the reactive power control means generates the reactive power command value Qref so as to suppress the voltage rise at the grid connection point 3a based on the outputs of the current transformer 112 and the voltage transformer 111 of the second power conversion device 42.

That is, the second control circuit 144 executes the processing of the step S108 of FIG. 4 in place of the wind farm control device 13. The second control circuit 144 controls the second inverter circuit 43 in accordance with the reactive power command value Qref. Except for this point, the power generation system 2 of FIGS. 1 and 2 and the power generation system 102 according to the modification of FIG. 5 have the same configuration and control operation functions.

The second control circuit 144 and the wind farm control device 113 are communicated by the communication signal S2. The wind farm control device 113 may transmit to the second control circuit 144 a predetermined signal indicating that the first inverter circuit 32 is turned off by using the communication signal S2. The second control circuit 144 may be configured such that, upon receiving the predetermined signal, the second control circuit 144 starts the reactive power compensation operation, i.e., the calculation and use of the reactive power command value Qref.

REFERENCE SIGNS LIST

1 Electric power grid
2, 102 Power generation system (wind power generation system with storage battery)
3 Power line
3a Grid connection point
10 Wind farm
11, 111 Voltage transformer
12, 112 Current transformer
13, 113 Wind farm control device
20 Wind power generation system part
21 AC transformer
22 Wind power generator
24 Wind turbine control unit
26 Anemometer
30 First power conversion device
31 Converter circuit
32 First inverter circuit
33 First control circuit
34 First AC reactor
35 First filter capacitor
36 First circuit breaker
37 DC capacitor
40, 140 Power storage device system part
41 Electric storage device
42, 142 Second power conversion device
43 Second inverter circuit
44, 144 Second control circuit
45 Second AC reactor
46 Second filter capacitor
47 Second circuit breaker
48 AC transformer
P1a AC output power
P1b Charge/discharge power
Pref Active power command value
Q1, Q2 Reactive power
Qref Reactive power command value
S0 Wind shortage signal
S1, S2 and S3 Communication signal
W1 Wind (high wind condition)
W2 Wind (low wind condition)

The invention claimed is:

1. A wind power generation system with a power storage device, comprising:
a wind power generation system part that includes
a wind power generator,
a first power conversion circuit for converting electric power generated by the wind power generator,
a first control circuit controlling the first power conversion circuit,
a filter capacitor provided at an output side of the first power conversion circuit, and
a circuit breaker interposed between the filter capacitor and a grid connection point,
the wind power generation system part being configured to output electric power converted by the first power conversion circuit to an electric power grid via the grid connection point;
a power storage device system part that includes
a power storage device,
a second power conversion circuit interposed between the power storage device and the grid connection point, and
a second control circuit controlling the second power conversion circuit to perform load leveling operation between the power storage device and the electric power grid via the grid connection point; and
reactive power control means configured to provide a reactive power command value to the second control circuit for causing the second power conversion circuit to perform reactive power compensation operation in a state in which the filter capacitor is connected to the grid connection point by making the circuit breaker connected and the first power conversion circuit is stopped, the reactive power compensation operation being an operation in which the second power conversion circuit receives reactive power from the filter capacitor via the grid connection point.

2. The wind power generation system with the power storage device according to claim 1,
wherein the wind power generation system part further includes a wind turbine control unit providing a signal to the first control circuit when the wind power generator meets a predetermined low wind condition, and
wherein, upon receiving the signal, the first control circuit stops the first power conversion circuit.

3. The wind power generation system with the power storage device according to claim 1,
wherein a plurality of the wind power generation system parts are connected to the grid connection point,
wherein the wind power generation system with the power storage device further includes,
a potential transformer connected to a power line between the grid connection point and the electric power grid, and
a wind farm control device controlling the plurality of the wind power generation system parts based on an output of the potential transformer,
wherein the reactive power control means includes the wind farm control device, and
wherein the wind farm control device as the reactive power control means generates the reactive power command value based on the output of the potential transformer so as to suppress a voltage rise at the grid connection point, and transmits the reactive power command value to the second control circuit.

4. The wind power generation system with the power storage device according to claim 1, further comprising
a potential transformer connected to a power line between the second power conversion circuit and the grid connection point,
wherein the reactive power control means includes the second control circuit, and
wherein the second control circuit as the reactive power control means generates the reactive power command value based on an output of the potential transformer so that a voltage rise at the grid connection point is suppressed, and controls the second power conversion circuit in accordance with the reactive power command value.

* * * * *